No. 657,427. Patented Sept. 4, 1900.
F. A. LANSING.
FORM FOR BOILING MEATS.
(Application filed Aug. 15, 1899.)
(No Model.)
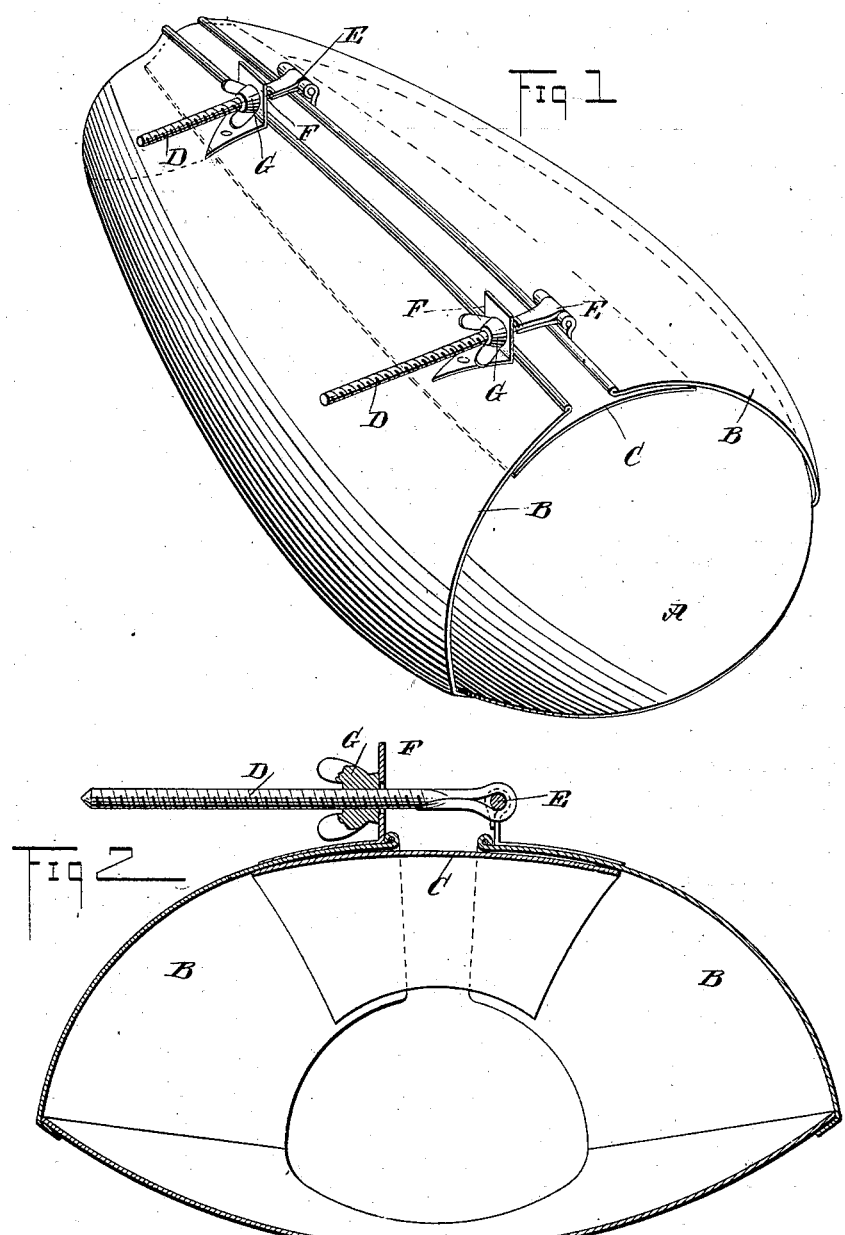
WITNESSES:
INVENTOR
F. A. Lansing
BY
ATTORNEYS

United States Patent Office.

FREDERICK ANTHON LANSING, OF NEW YORK, N. Y.

FORM FOR BOILING MEATS.

SPECIFICATION forming part of Letters Patent No. 657,427, dated September 4, 1900.

Application filed August 15, 1899. Serial No. 727,322. (No model.)

*To all whom it may concern:*

Be it known that I, FREDERICK ANTHON LANSING, of the city of New York, borough of Brooklyn, in the county of Kings and State of New York, have invented a new and Improved Form for Boiling Meats, of which the following is a full, clear, and exact description.

My invention relates to an improvement in devices for holding meats in place during boiling; and it consists of a casing of peculiar construction which is designed to receive the meat and to hold the same securely in shape while being boiled.

My invention comprises the novel features which are hereinafter described and claimed.

Reference is to be had to the accompanying drawings, forming a part of this specification, in which similar characters of reference indicate corresponding parts in both figures.

Figure 1 is a perspective view of my device, and Fig. 2 is a cross-sectional elevation taken adjacent to one of the clamping-bolts.

In boiling meats, such as hams, it is the common practice to remove the bone before boiling and then to keep the meat in shape by tying the same up with strings. This takes considerable time, and, in addition, makes it necessary to trim off portions of the outer part of the ham in order to put the same in presentable condition before selling. My invention is designed to avoid these requirements, and thus to save both time and material.

My device consists of a casing which is formed of upper and lower parts, the lower part A consisting of a plate of thin metal which is of a width substantially equal to the width of the ham or other piece of meat which is to be placed therein. This bottom plate is curved as nearly as may be to the outline of the lower part of the piece of meat. The upper portion of the casing consists of two plates B, which are united at their lower edges with the side edges of the lower plate A. These plates are curved as nearly as may be to the outline of the upper portion of the piece of meat. The upper inner edges of these plates B do not meet in the center, but are separated a short distance, so as to permit of a limited extent of adjustment. A separate plate C is provided which is placed inside of the plates B and is designed to cover the space between the edges of the said plates B. One of the plates B has clamping-bolts D, secured thereto at its edge by hinges E. The other plate B has lugs F secured to its edges and provided with holes designed to receive the clamping-bolts D. These bolts are provided with thumb-nuts G, by means of which they may be readily adjusted.

In using my device the ham or other piece of meat is first boned after the usual manner and then instead of being tied up is inserted in the opening at the large end of one of these forms. The forms will of course be made of different sizes, so as to accommodate hams of different sizes, although they are adjustable within small limits. The ham after being inserted within the form is slightly compressed by tightening the bolts D and drawing the edges of the two parts B together. By this means the ham may be compressed as much as is necessary to retain it in proper shape. After insertion in the form the ham is placed in the boiler along with the form. After boiling the ham is removed from the form by first loosening the clamping-bolts D and then drawing the ham out of the opening at the large end of the form.

By the use of this device the time which is ordinarily consumed in tying up the piece of meat and the expense of the strings used will be saved, and in addition to this the ham after boiling will be in better shape than where it has been tied, as the creases ordinarily formed by the strings will be lacking, and it will not be necessary to trim the ham.

Having thus fully described my invention, I claim as new and desire to secure by Letters Patent—

1. A form for boiling meats, comprising a tapering metallic casing fitted to the general form of a piece of meat, the said casing being curved from end to end, larger at one end than the other, and having a longitudinal opening in its upper portion extending from end to end and permitting of its expansion and contraction, and means for drawing the edges of the opening together, substantially as described.

2. A form for holding meats for boiling, consisting of a casing slitted along one side so that it may expand and contract, a plate adapted to span said slit, and means for drawing the edges of the casing together, substantially as described.

3. A form for holding meats for boiling, consisting of a casing open at the ends and slitted on one side so that it may expand and contract, a plate adapted to span said slit, bolts secured to the casing at one edge of the slit, and eyes secured to the casing at the other edge of the slit and adapted to receive said bolts, whereby said edges may be drawn together.

4. A form for holding meats for boiling consisting of a metallic casing having a lower portion consisting of a curved plate and an upper portion comprising two curved plates connected at their lower edges with the side edges of the lower plate, the upper inner edges of the top plates being normally separated a short distance so as to permit of adjustment, a plate adapted to span the opening between the edges of the top plates, and means for drawing the edges together, substantially as described.

FREDERICK ANTHON LANSING.

Witnesses:
GEORGE W. LOZIER,
FREDERRIC LANSING.